United States Patent [19]

Bir et al.

[11] 4,360,501
[45] Nov. 23, 1982

[54] METHOD OF ISOTOPE SEPARATION

[75] Inventors: Roger Bir, Vanves; Jean-Pierre Schermann, Paris, both of France

[73] Assignee: Commissariat a l'Energie Atomique, Paris, France

[21] Appl. No.: 90,741

[22] Filed: Nov. 2, 1979

Related U.S. Application Data

[63] Continuation of Ser. No. 889,537, Mar. 23, 1978, abandoned.

[30] Foreign Application Priority Data

Mar. 29, 1977 [FR] France .............................. 77 09366

[51] Int. Cl.³ .............................................. B01D 59/00
[52] U.S. Cl. .................................... 423/3; 204/157.1 R
[58] Field of Search .......................... 250/423 P; 55/2; 204/157.1 R; 423/2, 3

[56] References Cited

U.S. PATENT DOCUMENTS

| | | | |
|---|---|---|---|
| 3,987,302 | 10/1976 | Hurst et al. | 250/283 |
| 4,000,051 | 12/1976 | Kaldor | 204/157.1 R |
| 4,000,420 | 12/1976 | Harris | 250/423 P X |
| 4,023,038 | 5/1977 | Jones et al. | 250/423 P |
| 4,176,025 | 11/1979 | Chen et al. | 204/157.1 R |

OTHER PUBLICATIONS

Robinson, C. P. et al. Some Developments in Laser Isotope Separation at Los Alamos. Presented at APS Meeting 2/25/76, N.Y., N.Y., #LA-UR-76-191.

Primary Examiner—Deborah L. Kyle

[57] ABSTRACT

An isotopic mixture composed of molecules $^1MX_n$ and $^2MX_n$, where $^1M$ and $^2M$ are two isotopic species of the atom M, is irradiated with a beam of monochromatic laser light with energy $h\nu$ in resonance with the energy difference between two vibrational levels of an isotopic species of the molecule $^1MX_n$. The $^1MX_n$ and $^2MX_n$ molecules also interact with the atoms of a neutral gas E in superactivated form in the Rydberg state $E^{**}$ in order to convert the molecules to negative ions by capture of the electrons released by the Rydberg atoms in accordance with the reactions:

$$^1MX_n + h\nu \rightarrow {}^1MX_n{}^*$$

$$E^{**} \rightarrow E^+ + e^-$$

$$^1MX_n{}^* + e^- \rightarrow {}^1MX_{n-1}{}^- + X$$

$$^2MX_n + e^- \rightarrow {}^2MX_n{}^-$$

6 Claims, 2 Drawing Figures

METHOD OF ISOTOPE SEPARATION

This is a continuation, of application Ser. No. 889,537, filed Mar. 23, 1978 now abandoned.

This invention relates to a method of isotope separation which makes it possible in particular to separate the $U^{235}$ and $U^{238}$ isotopes when these latter are included in molecules.

Among all the problems related to the production of energy from nuclear fuels, the problem of separation of the uranium isotopes 235 and 238 is one of the most difficult to solve. Since the historic method of separation by mass spectrograph, consideration has been given to many other methods. The advent of the laser and the exceptional monochromaticity of the light emitted by a laser have made it possible to contemplate and novel mode of separation in which transitions which are characteristic of an atom or of a molecule of a given isotopic species are preferentially excited by a laser radiation having a monochromaticity such that the width of the laser line is in fact smaller than or of the same order of magnitude as the energy interval resulting from the difference in masses of the atom or of the molecules in respect of the two isotopes considered.

It has rapidly become apparent that, although selective excitation of the electron levels of uranium atoms was possible with lasers, it remained difficult by reason of the high value of energy quantum of the photons required for electron excitation. The excitation of molecular vibration levels is much more advantageous than the excitation of electron levels from an energy standpoint since the transitions corresponding to vibration bands are of much lower energy. Furthermore, lasers which are capable of emitting photons having an energy of the order of a few fractions of electron-volts have high efficiencies; the most striking example is that of the pulsed carbon dioxide gas laser which makes it possible in addition to obtain very high output powers.

In a first known mode of selective separation of different molecules of different isotopic species, these different molecules are excited to very high vibrational levels in order to cause splitting of the molecule, excitation of the molecule being effected only in the case of a given isotope. Separation of the two parts of the split molecule from the molecule of the other isotope which is practically intact can be performed with relative ease by physico-chemical means. But this makes it necessary to excite the molecule with the laser light until this latter splits into two parts, which is sometimes difficult by reason of the anharmonicity of the higher levels in the vicinity of the continuum and of the total power required. In order to overcome these difficulties, consideration has already been given to the use of a first selective laser with energy in reasonance with the vibrational transition of a given isotopic species and of energy such as to produce preferential excitation of a molecule (including a given isotope) in order to excite and bring this latter to a state corresponding to the first vibrational levels. A second non-selective laster excites these molecules from the vibrational level already obtained to the level corresponding to the separation of the molecule into two parts. This two-step process has an advantage over the previous method in that it entails the use of only one selective laser in order to excite the first vibrational levels of the molecule. However, this method calls for the use of two lasers and is difficult to use since the second non-selective laser must have high photon energy and therefore low efficiency in the present state of the technique.

The method in accordance with the invention permits of separation of two given isotopic species after excitation of the first vibrational levels of a single isotopic species of the molecular mixture, this method being readily performed without any need to employ a second laser which usually has low efficiency.

The method in accordance with the invention consists in carrying out in known manner the irradiation of a molecular isotopic mixture composed of molecules of the type designated as $^1MX_n$ and $^2MX_n$, where $^1M$ and $^2M$ are two isotopic species of the atom M, with a beam of monochromatic laser light with energy $h\nu$ in resonance with the energy difference between two vibrational levels of an isotopic species of the molecule $^1MX_n$. The method in accordance with the invention is characterized in that the $^1MX_n$ and $^2MX_n$ molecules are also caused to interact with the atoms of a neutral gas E in superactivated form in the so-called Rydberg state $E^{**}$, in order to convert said molecules to negative ions $MX_n{}^-$ or $MX_{n-1}{}^-$ by capture of the electrons released by the Rydberg atoms in accordance with the reactions:

$$^1MX_n + h\nu \rightarrow {}^1MX_n^* \text{ (activated)} \quad (1)$$

$$E^{**} \rightarrow E^+ + e^- \quad (2)$$

$$^1MX_n^* + e^- \rightarrow {}^1MX_{n-1}{}^- + X \quad (3)$$

$$^2MX_n + e^- \rightarrow {}^2MX_n{}^- \quad (4)$$

Reaction (1) describes the interaction between a molecule of the isotopic species $^1M$ with the laser light ($h\nu$ photon) in order to produce an activated molecule in a higher vibrational state designated as $^1MX_n^*$.

The atom E is the Rydberg state $E^{**}$ can produce a positive ion $E^+$ and an electron $e^-$ either by collision or any other means. This electron $e^-$ is capable of interacting with both types of molecules $^1MX_n$ and $^2MX_n$ in order to produce a $^1MX_{n-1}{}^-$ ion in one case whereas a $^2MX_n{}^-$ ion is obtained in the other case. It is then only necessary to separate these two types of ions of very different physico-chemical species by means of any suitable method such as mass spectrometry, for example.

The atom M is preferably selected from the group comprising boron, sulphur, uranium; the atom X is preferably a halogen atom.

The neutral gas is usually a rare gas and preferentially argon since it is known that this latter has a high capture cross-section for the process $E^{**} \rightarrow E^+ + e^-$. Argon is also chemically inert with respect to the compound $MX_n$.

In accordance with the invention, the final species are thus negatively charged particles; the step which requires high energy and results in dissociation of the molecule is no longer performed by means of a laser. In accordance with the invention, the dissociation energy is provided by the electronic affinity of the $MX_n$ molecule. The formation of negative ions can be obtained by electron impact but this method suffers from major disdvantages. In fact, the capture cross-section for the formation of negative ions is of appreciable value only in the case of electrons of very low energy and therefore in practice for thermal electrons or in other words electrons of energy below 0.1 eV. Tens of thousands of collisions must take place in order to obtain these electrons and this essentially entails the need for high pressures (20 to 50 torr) which often prove objectionable since these constitute a line broadening factor. Moreover, the presence of large numbers of electrons and negative ions produces a high space charge and interferes with the process as a whole to a considerable extent.

The present invention makes use of another means for producing the electrons which are necessary for the formation of negative ions. Thus a neutral gas such as argon, for example, is employed in a state in which the principal quantum number is very high (20 to 100). This state is known as the Rydberg state. The atom then has an energy which is very slightly lower than the ionization threshold. The atom remains netural but one of its electrons is very loosely bound. The atom in this state is a neutral transporter of electrons, the properties of which are particularly advantageous in the method under consideration. Thus the lifetime is very long and, above all, the transfer cross-section of the most loosely bound electron attains the exceptionally high value of $10^{-12}$ cm$^2$, namely at least one hundred times greater than the usual cross-sections. In a general manner, the formation of the negative ion thus takes place in accordance with the reaction:

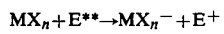

$$MX_n + E^{**} \rightarrow MX_n^- + E^+$$

The result of the reaction is generally neutral, thus removing the difficulties related to the space charge and permitting the use of multisource systems.

Finally, the creation of negative ions is particularly advantageous in the case of uranium since a whole family of substances such as $UF_5^+$, $UF_4^+$, for example, is obtained by means of the creation of positive ions whereas only one negative ion $UF_6^-$ is obtained by means of the method proposed.

Further distinctive features and advantages of the invention will become more clearly apparent from the following description of exemplified embodiments which are given by way of explanation and not in any sense by way of limitation, reference being made to the accompanying drawings, wherein.

Figure 1:
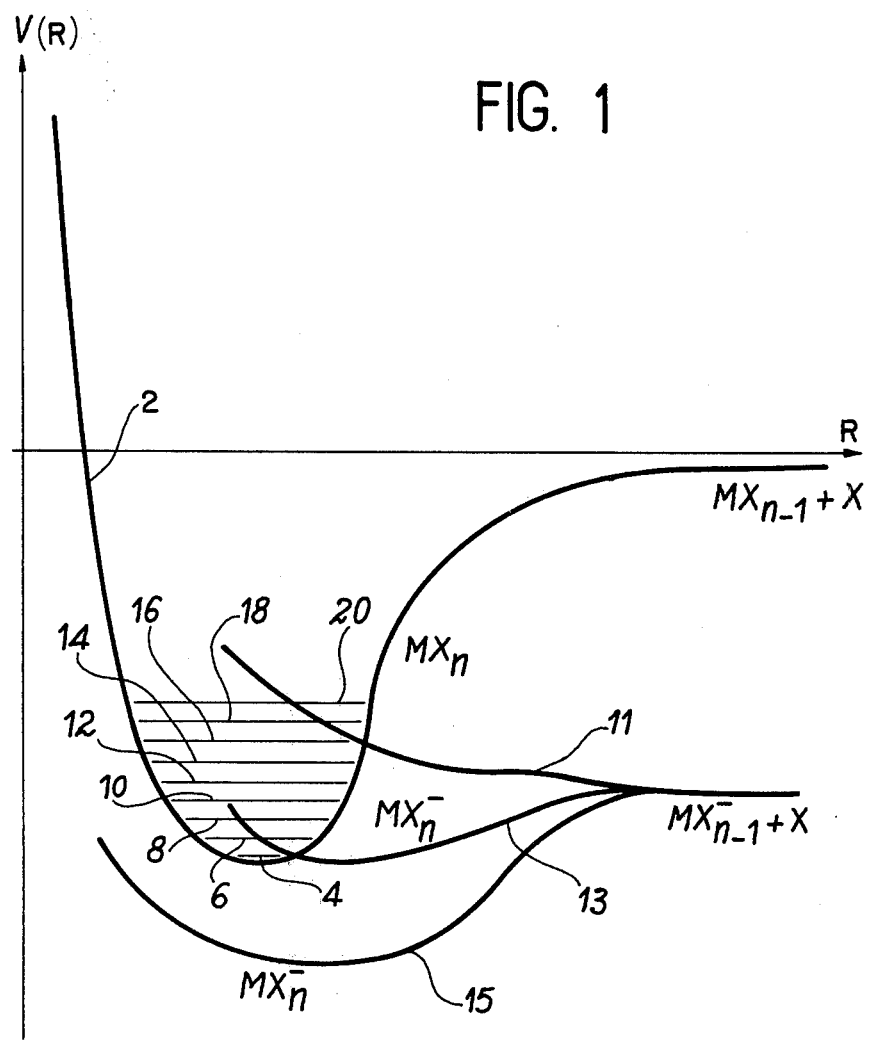
FIG. 1 is a diagram of the different energy states of the molecule $MX_n$.

In FIG. 1, the distance R which separates two fractions of the molecules examined has been plotted as abscissae and the potential energy associated with this separation has been plotted as ordinates. Curve 2 relates to the molecule $MX_n$ and the horizontal lines in the potential well such as the lines 4, 6, 8, 10 and so forth are the vibrational energy levels of this molecule.

The curves 11, 13 and 15 which are of conventional type to anyone versed in the technique of spectroscopy represent the curves corresponding to an isotopic mixture of molecules $MX_n$. When the distance between the two parts of the molecule becomes greater than a certain value, the molecule splits so as to result in $^1MX_{n-1}+X$. Curve 2 is the same for both isotopic species and the isotopic vibrational levels coincide. However, the frequency of the laser light is such that this latter excites only one isotopic species such as the molecule $^1MX_n$ for example which rises to higher vibrational levels such as the levels 6, 8, 10 and so forth under the action of the laser radiation. If this molecule is excited to a sufficient extent above the level 20, for example, said molecule changes over to state $^1MX_{n-1}+X$ which corresponds to a lower energy under the action of the free electrons of the atom in the Rydberg state. On the contrary, the molecules which are not excited by the laser light of the other isotopic species $^2MX_n$ are converted to negative ions by electrons released by the atoms in the Rydberg state and produce the negative ions $^2MX_n^-$ which return to a fundamental level $MX_n$ represented on the curve 15. Thus one isotopic species produces an $MX_n^-$ ion and another isotopic species produces an $MX_{n-1}^-$ ion. The separation of these two ionic species is now an easy matter by virtue of their large difference in mass and also by reason of any difference in their chemical properties. The specificity of the excitation which results in dissociation is obtained by means of a laser having a narrow spectral width.

Figure 2:
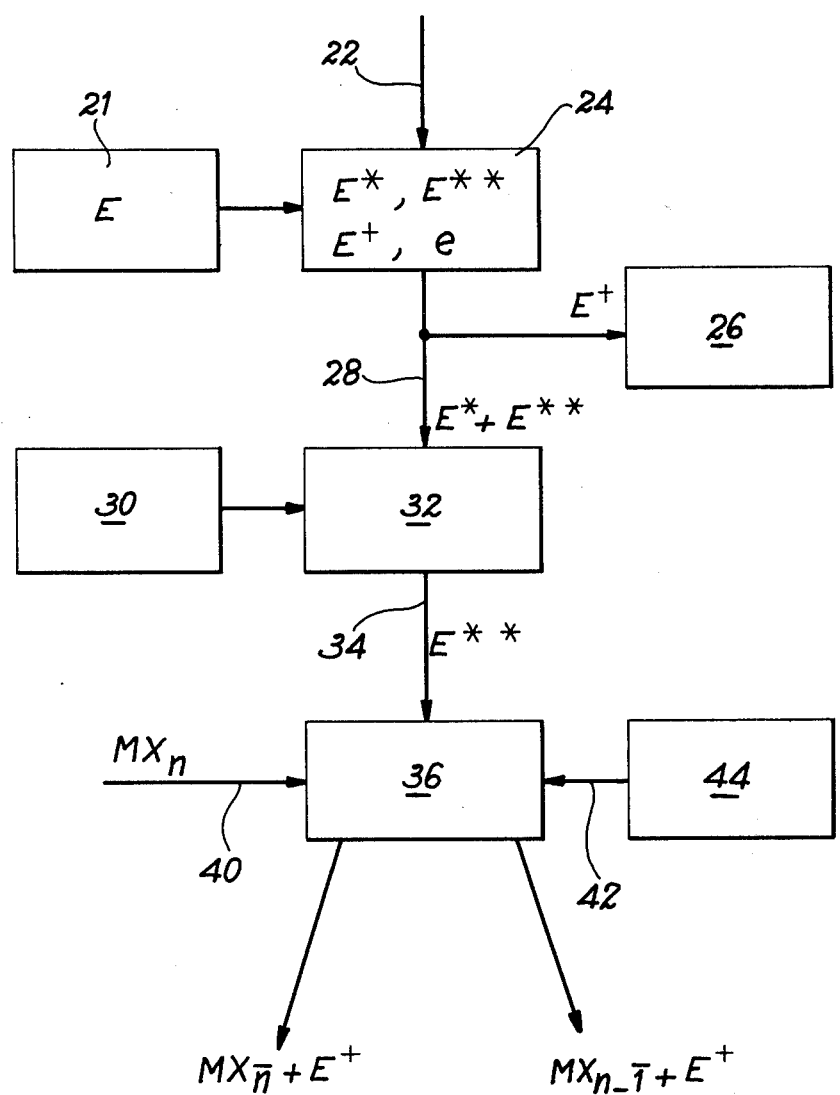
FIG. 2 is a diagram of the different operations performed in order to obtain isotope separation in accordance with the invention.

The method as a whole can now be considered with reference to the diagram of FIG. 2. In this figure, a source E of gas such as argon, for example, is shown diagrammatically at 21 and excited in the Rydberg state under the action of an electron beam 22 within a collision chamber 24. The electron beam can be obtained by conventional means such as thermo-ionic emission, for example. Within the collision chamber 24 are produced different particle species: E* which is the radiative or metastable exicted gas, E** which is the gas in the Rydberg state, E+ which is the ionized gas and electrons e.

Of the species created within the chamber 24, only E** is to be retained. The E+ ion is deflected by known means,(electrostatic or magnetic means not shown in the drawings) and then directed into a box 26 in which it is captured. A similar device (not shown) can be provided for removing the electrons from the beam. The beam 28 thus only contains the neutral species E* and E. A discharge lamp 30 illuminates the box 32. The atoms in the metastable state are removed within said box by the process known as quenching. At the exit of the box 32, the beam 34 contains only the desired particles E. Into the reaction chamber 36 are admitted respectively the molecules $MX_n$ forming the beam 40, the electron carriers E**, that is to say the atoms in the Rydberg state (beam 34) and a monochromatic light beam 42 emitted by the laser 44. In accordance with the mechanism described earlier, the reaction products are $^1MX_{n-1}^- + X$ in the case of the resonant isotope $^1M$ and $^2MX_n^-$ in the case of the nonresonant isotope.

Efficient separation of the isotope accordingly consists in separating the ions $^2MX_n^-$ and $^1MX_{n-1}^-$. Though not illustrated in the drawings, the device employed for the separation process can be a mass spectrometer which does not need to have high resolution and in which the space charge is neutralized by the presence of the E+ ions. Another device could be constituted by a reaction chamber in which the ions $MX_{n-1}^-$ produced by conventional means would react with the ions $MX_{n-1}$ in order to produce the dimer $(MX_{n-1})_2^*$. Other devices for separating the negative ions can be employed without thereby departing from the scope of the invention.

EXAMPLES OF PRACTICAL APPLICATION

There is employed a device for isotope separation formed by a cell containing $SF_6$ gas under a pressure of $2 \times 10^{-3}$ torr (namely $6 \times 10^{-}$ molecules per cm$^3$). This cell has a length of 1 meter and is connected to a cell containing argon. Provision is made within said cell for heated tungsten filaments which emit electrons and produce atoms in Rydberg states with a density of $10^{12}/cm^3$.

By adopting the dissociative attachment cross-section:

$$XF_6 + Ar^{**} \rightarrow XF_5^- + F + Ar^+$$

which is equal to $10^{-14}$ cm$^2$, all the argon atoms are employed in the cross-section if the cell diameter is 10 cm.

A $CO_2$ laser beam is passed through two KCl windows placed at the ends of the vessel and undergoes ten multiple passes (see the article by S. Awillier and J. P. Schermann, Optics Communication, October 1976), namely an effective length of 10 meters.

(1) Pulsed laser

If the laser employed delivers pulses each having a length of 250 ns with an energy of 0.5 Joule (see R. V. Ambartzumian et al., Optics Communication, September 1976), the dissociation rate is $4\times10^{-3}$. If the laser beam has a cross-sectional area of 0.2 cm$^2$, the useful volume traversed by the laser beam is 0.2 cm$^2 \times$ 10 meters = 200 cm$^3$. Each laser pulse will dissociate:

$$6\times10^{13}/cm^3 \times 4\times10^{-3} \times 200\ cm^3 = 4.8 10^{13}\ \text{molecules per pulse.}$$

If the laser delivers one pulse per second, there will be obtained:

0.1 mg/hour/cell.

(2) Continuous laser

In the case of a laser which delivers 1 watt in continuous emission, the dissociation rate is $10^4$ times lower than previously if the beam is focused on 0.2 mm$^3$ (see D. Keefer, J. Allen, Chemical Physics Letters, October 15th, 1976). The filling rate is $$\frac{1\ \text{sec}}{250\ \text{ns}} = 4 \times 10^6$$

times higher. The gain is therefore $$\frac{4 \times 10^6}{10^4} = 400.$$

The result thus achieved is 40 mg/hour/cell in the case of a laser having an output power of 1 watt.

What we claim is:

1. A method of isotope separation which consists in carrying out the irradiation of a molecular isotopic mixture composed of molecules of the type $^1MX_n$ and $^2MX_n$ where $^1M$ and $^2M$ are two isotopic species of the atom M with a beam of monochromatic laser light with energy $h\nu$ in resonance with the energy difference between two vibrational levels of an isotopic species of molecules $^1MX_n$ and the molecules $^1MX_n$ and $^2MX_n$ are then also caused to interact with the atoms of a neutral gas E in superactivated form, wherein said interaction is carried out in the so-called Rydberg state $E^{**}$ in order to convert said molecules to negative ions by capture of the electrons released by the Rydberg atoms in accordance with the reactions:

$$^1MX_n + h\nu \rightarrow\ ^1MX_n^*$$

$$E^{**} \rightarrow E^+ + e^-$$

$$^1MX_n^* + e^- \rightarrow\ ^1MX_{n-1}^- + X$$

$$^2MX_n + e^- \rightarrow\ ^2MX_n^-$$

2. A method of isotope separation according to claim 1, wherein the atom M is selected from the group comprising boron, sulphur and uranium and wherein the atom X is a halogen.

3. A method according to claim 1, wherein the atoms in the Rydberg state are obtained by electron bombardment of the neutral gas atoms.

4. A method according to claim 1, wherein the energy of the electrons released by collision of the atoms in the Rydberg state is lower than 0.1 volt.

5. A method according to claim 1, wherein the two created species $^1MX_{n-1}$ and $^2MX_n$ are separated by mass spectrometry.

6. A method according to claim 1, wherein a carbon dioxide laser is employed.

* * * * *